US012546571B2

(12) United States Patent
Meron et al.

(10) Patent No.: US 12,546,571 B2
(45) Date of Patent: Feb. 10, 2026

(54) VISIBILITY-IMPAIRING SECURITY DEVICE

(71) Applicant: Essence Security International (E.S.I.) Ltd., Herzlia Pituach (IL)

(72) Inventors: Sergey Meron, Netanya (IL); Pavel Lindberg, Rosh HaAyin (IL); Eran Vendriger, Tel-Aviv (IL); Eran Cohen, Tel-Aviv (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 274 days.

(21) Appl. No.: 18/563,279

(22) PCT Filed: May 24, 2022

(86) PCT No.: PCT/IL2022/050547
§ 371 (c)(1),
(2) Date: Nov. 21, 2023

(87) PCT Pub. No.: WO2022/249175
PCT Pub. Date: Dec. 1, 2022

(65) Prior Publication Data

US 2024/0240920 A1 Jul. 18, 2024

(30) Foreign Application Priority Data

May 25, 2021 (IL) ........................................ 283437

(51) Int. Cl.
*F41H 9/06* (2006.01)
*G08B 15/02* (2006.01)

(52) U.S. Cl.
CPC .............. *F41H 9/06* (2013.01); *G08B 15/02* (2013.01)

(58) Field of Classification Search
CPC .. F41H 9/06; F41H 9/10; G08B 15/02; B05B 1/185; B05B 9/0861
(Continued)

(56) References Cited

U.S. PATENT DOCUMENTS

| | | | | | |
|---|---|---|---|---|---|
| 4,446,990 | A | * | 5/1984 | Stevenson | F41H 9/10 222/398 |
| 4,841,752 | A | | 6/1989 | Fletcher | |
| 5,349,335 | A | | 9/1994 | Lin | |
| 5,476,192 | A | * | 12/1995 | Julinot | B65D 83/22 222/153.13 |

(Continued)

FOREIGN PATENT DOCUMENTS

| | | | |
|---|---|---|---|
| WO | 2020129062 | A1 | 6/2020 |
| WO | 2020129063 | A1 | 6/2020 |

(Continued)

OTHER PUBLICATIONS

Foreign Communication from a Related Counterpart Application, International Search Report and Written Opinion dated Mar. 8, 2018, International Application No. PCT/IL2022/050547 filed on May 24, 2022.

(Continued)

*Primary Examiner* — Steven J Ganey
(74) *Attorney, Agent, or Firm* — Conley Rose, P.C.

(57) ABSTRACT

A visibility-impairing security device is disclosed for producing a gathering of air-suspended light-obscuring matter to obscure vision. The device comprises a body comprising an emission unit receiving portion for holding an emission unit having an outlet for emitting the matter; an opening for the passing therethrough of the matter from the outlet; and a door for closing the opening. The door is configured to move between a closed position in which the opening is covered and an open position in which the opening is at least partially open, thus allowing for the passing therethrough of the matter from the outlet when the door is in the open position.

20 Claims, 8 Drawing Sheets

(58) Field of Classification Search
USPC .................. 239/154, 332, 337, 600; 222/175
See application file for complete search history.

(56) References Cited

U.S. PATENT DOCUMENTS

| | | | | |
|---|---|---|---|---|
| 5,709,320 | A * | 1/1998 | Jimenez | F21V 33/0064 222/175 |
| 5,921,442 | A * | 7/1999 | Keller | B05B 11/1087 222/79 |
| 6,932,246 | B2 * | 8/2005 | Crosnier | B05B 11/0037 239/472 |
| 9,267,767 | B2 * | 2/2016 | Hwang | B05B 7/2405 |
| 2007/0194048 | A1 | 8/2007 | Teig | |

FOREIGN PATENT DOCUMENTS

| | | | |
|---|---|---|---|
| WO | 2021090234 | A1 | 5/2021 |
| WO | 2022249175 | A1 | 12/2022 |

OTHER PUBLICATIONS

Foreign Communication from a Related Counterpart Application, Partial Search Report dated Oct. 4, 2022, International Application No. PCT/IL2022/050547 filed on May 24, 2022.

Foreign Communication from a Related Counterpart Application, International Preliminary Report on Patentability dated Dec. 7, 2023, International Application No. PCT/IL2022/050547 filed on May 24, 2022.

* cited by examiner

VISIBILITY-IMPAIRING SECURITY DEVICE

CROSS-REFERENCE TO RELATED APPLICATIONS

The present application is a filing under 35 U.S.C. 371 as the National Stage of International Application No. PCT/IL2022/050547, filed May 24, 2022, entitled "A VISIBILITY-IMPAIRING SECURITY DEVICE," which claims priority to Israel Application No. 283437 filed with the Intellectual Property Office of Israel on May 25, 2021, both of which are incorporated herein by reference in their entirety for all purposes.

RELATED APPLICATION

This application claims the benefit of priority of Israel Patent Application No. 283437 filed on 25 May 2021, the contents of which are incorporated herein by reference in their entirety.

FIELD OF DISCLOSURE

The disclosure relates to a visibility-impairing security device. Particularly, but not exclusively, the device may be configured to emit smoke or fog after detection of an intruder.

BACKGROUND

Visibility-impairing security devices may be used to produce a gathering of air-suspended light-obscuring matter, e.g. a composition of water vapor or smoke, in order to make it difficult for an intruder to see their environment.

The matter may be emitted from an emission unit held by the device, when power is supplied to the emission unit. The provision of power to electrical terminals of the emission unit, e.g. in the form of a voltage pulse, may trigger a reaction (e.g. an exothermic reaction) in the emission unit, resulting in production and release of the matter. Furthermore, the reaction may be unstoppable once started.

The matter may be emitted through an opening in a body of the device. In some devices, the opening may be left uncovered. A lack of a cover may result in the potential for environmental damage or degradation to components inside the body. It may be possible for a third party to see inside the device by looking through the opening. There may be the risk of the third party tampering with the device by accessing internal components through the opening.

In some devices, the opening is covered by a cap. When the matter is released, the cap is blown off by a pressure of the matter emitted. In some devices, the cap is tethered to the device so that the cap is not lost after it is blown off. The use of a blow-off cap may result in a full or partial loss of control of the cap after the cap is blown off.

SUMMARY

One or more aspects of the present disclosure relate to visibility-impairing security devices configured to output smoke or fog or the like, for example, as a deterrent in response to detection of a security related event (e.g. sensing an intruder's motion).

In accordance with a first aspect of the disclosure there is provided a visibility-impairing security device for producing a gathering of air-suspended light-obscuring matter to obscure vision, the device comprising:

a body comprising:

an emission unit receiving portion for holding an emission unit having an outlet for emitting the matter;

an opening for the passing therethrough of the matter from the outlet; and a door for closing the opening, wherein the door is configured to move between a closed position in which the opening is covered and an open position in which the opening is at least partially open, thus allowing for the passing therethrough of the matter from the outlet when the door is in the open position.

Embodiments of the first aspect of the disclosure therefore relate to security devices in which light-obscuring matter may be output as a deterrent to ward off an intruder and in which a door is provided to protect an opening through which the matter is output. The door may provide a environmental protection to components within the device. The door may minimise dust, water or foreign material that could otherwise enter the device to potentially interfere with electronics or other components of the device. The door may deter or prevent tampering with components within the device. The door may make it harder to block or otherwise tamper with the emission unit.

The door is for selectively closing the opening. The door is configured to be operable between a closed position that closes the opening and an open position in which the opening is at least partially, mostly or fully uncovered.

The door may be configured to move between the closed position and the open position by rotation around a pivot axis.

The door may comprise a flow containment feature to increase torque upon the door by the flow of the matter.

The door may comprise at least one raised feature formed on an inner surface of the door, such that the at least one raised feature is inside the body of the device when the door is in the closed position.

The at least one raised feature may be shaped and positioned to resist flow of matter emitted from the emission unit to thereby increase a torque upon the door by emitted matter.

The at least one raised feature may border an area of the inner surface of the door that is impacted by a central axis of an emission of matter from the emission unit.

The at least one raised feature may comprise at least two raised features.

The at least one raised feature may comprise at least one rib. The at least one raised feature may comprise at least two ribs.

The at least one raised feature may follow a path of at least one line. The at least one raised feature may follow a path of at least one continuous line.

The at least one raised feature may comprise at least one circular feature. The at least one raised feature may comprise at least two circular features.

The at least one raised feature may comprise a first raised feature and a second raised feature. The first raised feature and second raised feature may be separated by a separation distance of at least 3 mm, optionally at least 5 mm, further optionally at least 8 mm. The first raised feature and second raised feature may be separated by a separation distance of less than 15 mm, optionally less than 10 mm, further optionally less than 8 mm. The separation distance may be around 6 mm.

The separation distance may be around 4.5 mm.

The at least one raised feature may comprise a first circular feature, and a second circular feature arranged inside the first circular feature. The second circular feature may be concentric with the first circular feature.

The first circular feature and second circular feature may be separated by a separation distance of at least 3 mm, optionally at least 5 mm. The first circular feature and second circular feature may be separated by a separation distance of less than 15 mm, optionally less than 10 mm, further optionally less than 8 mm. The separation distance may be around 6 mm. The separation distance may be around 4.5 mm. The separation distance may be a radial distance.

The door may comprise at least one recessed feature formed on an inner surface of the door, such that the at least one recessed feature is inside the body of the device when the door is in the closed position.

The at least one recessed feature may comprise at least two recessed features.

The at least one recessed feature may comprise at least one circular feature. The at least one recessed feature may comprise at least two circular features.

The at least one recessed feature may comprise a first circular feature, and a second circular feature arranged inside the first circular feature. The second circular feature may be concentric with the first circular feature.

The door may be hinged.

A first end of the door may be towards the back of the device. An axis around which the door rotates may be closer to the first end of the door than to a second, opposing end of the door that is nearer the front of the device.

The axis around which the door rotates may be offset from the first end of the door.

The first end of the door may comprise a first angled feature configured to interface with a corresponding angled feature at a corresponding end of the opening. The second end of the door may comprise a first angled feature configured to interface with a corresponding angled feature at a corresponding end of the opening. The first angled feature and corresponding angled feature may be configured such that a flush fit of the door within the opening is obtained when the door is in the closed position.

The body of the device may comprise a stepped feature recessed into the body and configured to accept a portion of the door when the door is in the closed position. The stepped feature may be positioned adjacent the second end of the door when the door is closed. The stepped feature may be configured such that a flush fit of the door within the opening is obtained when the door is in the closed position.

The door may be formed from a plastic or thermoplastic.

The emission unit may comprise a canister in which the air-suspended light-obscuring matter is generated. The emission unit may comprise a housing for holding the canister.

The emission unit receiving portion may be configured to hold the emission unit such that matter emitted from the outlet is emitted towards the bottom of the device. The opening may be positioned within a bottom portion of the body of the device.

The outlet and the opening may be configured so that emission of the matter from the outlet is directed directly through the opening.

The outlet of the emission unit may be oriented to direct the matter downwards and forwardly, but more downwards than forwardly, when the matter is emitted.

The opening may be sized to accommodate a trajectory of the matter emitted from the emission unit.

The trajectory of the matter emitted from the emission unit may be a cone trajectory.

The cone trajectory may have a cross-section in a plane in which the door lies when the door is closed, wherein the cross section lies largely, or more preferably, entirely within an area covered by the door.

The cross section may lie largely, or more preferably, entirely within an area having a perimeter defined by the at least one feature.

The body may further comprise a magnet affixed to or near an edge of the door and a corresponding ferromagnetic material affixed to or near a corresponding edge of the opening, wherein the magnet and ferromagnetic material are configured to hold, or assist in holding, the door in the closed position.

The body may further comprise a ferromagnetic material affixed to or near an edge of the door and a corresponding magnet affixed to or near a corresponding edge of the opening, wherein the magnet and ferromagnetic material are configured to hold, or assist in holding, the door in the closed position.

The opening may be positioned within a bottom portion of the body of the device. The bottom portion may have a bottom surface. The opening may be toward a rear of the bottom surface.

The bottom surface may have a total surface area that is greater than an area spanned by the opening.

The bottom portion of the body of the device may be releasably attached to a main portion of the body of the device.

The bottom portion of the body of the device may be releasable by a sliding action.

The bottom portion of the body may comprise a push feature at an edge of the bottom portion, wherein the push feature is for assisting in releasing of the bottom portion by finger contact with the push feature. The opening may be offset from said edge of the bottom portion to accommodate positioning of the push feature.

The body may further comprise a battery holding area for holding at least one battery.

The emission unit receiving portion and the battery holding area may be adjacent to each other.

The emission unit receiving portion may be longitudinal. The battery holding area may be thermally isolated from the emission unit receiving portion.

The battery holding area may be in front of the emission unit receiving portion.

The opening may be positioned such that the opening does not overlap the battery holding area.

The emission unit may generate the air-suspended light-obscuring matter upon delivery of energy from one or more batteries housed in the battery holding area.

The body may comprise a mechanical barrier, e.g. a wall, between the battery holding area and the emission unit receiving portion. The mechanical barrier may lie in a plane that is parallel to a longitudinal axis of the emission unit when held in the emission unit receiving portion. The mechanical barrier may be thermally insulative (e.g. by being comprised of a plastic or thermoplastic).

The device may further comprise a lens component located at a front side of the device intended to face away from a wall when a rear of the device is mounted facing a wall. The lens component may be the lens of a motion detector or camera.

The lens component may provide a sensor with a field of view that comprises a field of view that is symmetric about an axis intended to be vertical when the device is mounted against a wall. The sensor may comprise a pyroelectric sensor of a PIR motion detector. The sensor may comprise an image sensor.

The field of view may span more towards a bottom end of the body than a top end of the body so as be directed more towards a floor than a ceiling when installed in a room.

In accordance with a second aspect of the disclosure there is provided a kit for producing a gathering of air-suspended light-obscuring matter to obscure vision, the kit comprising: a visibility-impairing security device according to the first aspect; and an emission unit for emitting the matter.

It will be understood that the light-obscuring matter is configured to obscure at least visible light (i.e. visible light-obscuring matter). As such a person will not be able to see any objects through the light-obscuring material, or at least not well, and this will serve to disorientate and slow or stop a potential intruder in their tracks while security personnel are summoned.

The average particle size of the light-obscuring matter may be equal to or smaller than a maximum wavelength of a near-infrared range of an electromagnetic spectrum. For example, the light-obscuring matter may have a particle size of between 0.2 microns and 1 micron and an average particle size within that range. The near-infrared range is generally considered to have a maximum wavelength of 2.5 microns.

The light-obscuring matter may be output to generate fog. For example, the emission unit may be configured to emit water or water-based droplets to form fog after emission into the environment.

In some embodiments, the light-obscuring matter may comprise (or be) particulate material.

The light-obscuring matter may comprise smoke. In some embodiments, the light-obscuring material may be smoke.

The device may further comprise a detector configured to detect a security related event.

The detector may be configured to provide an indication of the security related event to one or more processors.

The emission of the matter by the emission unit may be on receipt of a trigger from the security device, a control hub, a server or a monitoring station.

The receipt of the trigger may be in response to the security related event.

The detector may comprise at least one item selected from a group consisting of: a motion sensor, a vibration sensor, a magnetic sensor, a proximity sensor, a threshold sensor, a door sensor, a window sensor, a passive infrared sensor, a thermal camera, a video camera, an active reflected wave detector, a radar device, a sonar device and a lidar device.

A security system may comprise the device of the first aspect and at least one device selected from a group consisting of: a control hub; a server; and a monitoring station; wherein the at least one device is configured to transmit a trigger, identifying the need for outputting light-obscuring matter, to the emission unit.

The monitoring station may be configured to receive data from a detector and/or camera and to present the data to an operator via a display, such that an operator may decide whether or not to trigger the output of the light-obscuring matter.

The data received from the camera may correspond to one or more images taken in response to detection of a security related event.

These and other aspects will be apparent from the embodiments described in the following.

The scope of the present disclosure is not intended to be limited by this summary nor to implementations that necessarily solve any or all of the disadvantages noted.

Any features described in relation to one aspect of the disclosure may be applied to any one or more other aspect of the disclosure.

BRIEF DESCRIPTION OF THE SEVERAL VIEWS OF THE DRAWINGS

For a better understanding of the present disclosure and to show how embodiments may be put into effect, reference is made to the accompanying drawings in which.

DETAILED DESCRIPTION

Figure 1A:
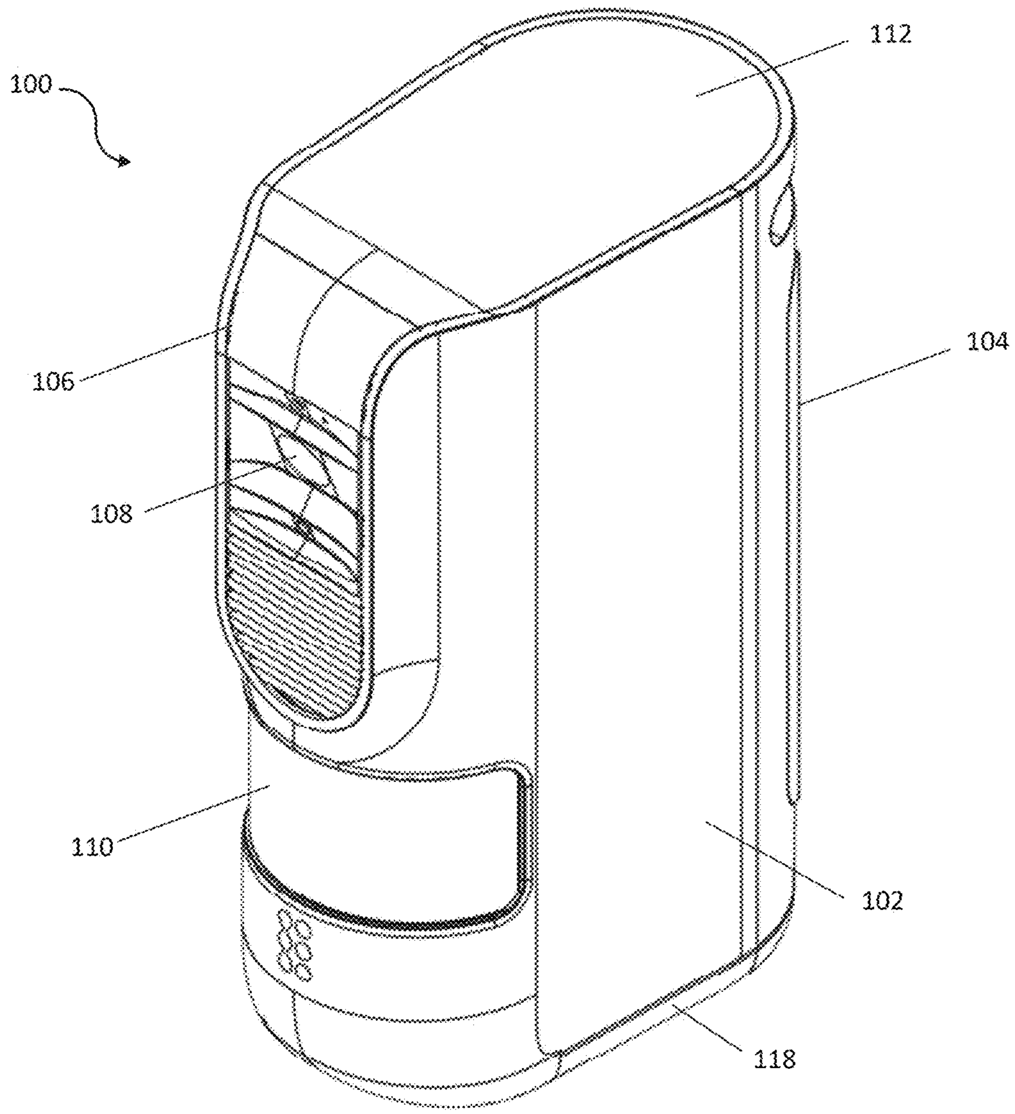
FIG. 1A illustrates a front and side perspective view of a security device according to an embodiment of the disclosure.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

In the following embodiments, like components are labelled with like reference numerals.

As used herein, except wherein the context requires otherwise, the terms “comprises”, “includes”, “has” and grammatical variants of these terms, are not intended to be exhaustive. They are intended to allow for the possibility of further additives, components, integers or steps.

Specific embodiments will now be described with reference to the drawings.

Figure 1B:
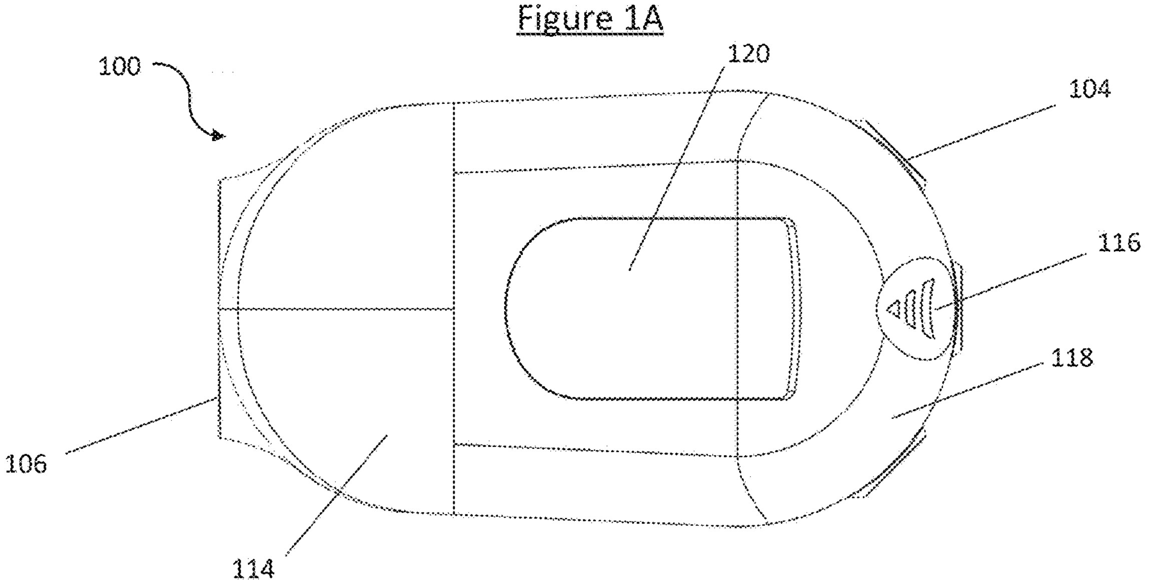
FIG. 1B illustrates a bottom view of the security device of FIG. 1A.

FIGS. 1A and 1B illustrate a visibility-impairing security device 100 for producing a gathering of air-suspended light-obscuring matter (not shown) to obscure vision. The device 100 comprises a body 102 having a rear surface 104 for mounting on a wall or other substantially vertical support surface and an opposite front surface 106 comprising a camera lens 108 for an imaging sensor (not shown) which captures an image of the scene, e.g. to verify a detected security-related event. The security-related event may for example be detected by motion detector, e.g. PIR motion detector. The front surface 106 also includes a lens component 110, for the PTR detector, located at a front side of the device 100 intended to face away from a wall when the rear surface 104 of the device 100 is mounted facing a wall. The lens component 110 (e.g. a Fresnel lens sheet) may be provided in front of a further sensor (e.g. at least one pyroelectric sensor of the PIR motion detector). The image sensor and/or at least one pyroelectric sensor may be provided with a field of view comprising a field of view that is symmetric about an axis intended to be vertical when the device 100 is mounted against a wall. The field of view may span more towards a bottom end of the body 102 than a top end 112 of the body 102 so as be directed more towards a floor than a ceiling when installed in a room.

In some embodiments, only one sensor may be provided in the device 100 (e.g. instead of both an imaging sensor and a pyroelectric sensor).

As shown in FIG. 1B, the device 100 has a removable bottom portion 118 that is releasably attached to a remainder of the body of the device. The remainder of the body of the device may be referred to as main portion of the body of the device. The bottom portion 118 may also be referred to as a base portion 118.

The bottom portion 118 of the body of the device is releasable by using a sliding action to move the bottom portion 118 relative to the body in a direction of movement from the back of the body 102 towards the front of the body 102. The device 100 has a bottom surface 114 comprising a push feature 116 for gripping the base portion 118 of the device 100 for removal thereof. The push feature 116 may also be referred to as a finger notch 116.

The bottom surface 114 also comprises a door 120 that is generally closed in use but is selectively openable to permit release of light-obscuring matter into the surrounding environment through an opening 404 (not shown in FIG. 1B) in the body 102 of the device 100. The door occupies only a portion of the bottom surface 114. The bottom surface 114 has a total surface area that is greater than an area of the door 120.

The door 120 is described in further detail below with reference to FIGS. 3 to 8.

Figure 2:
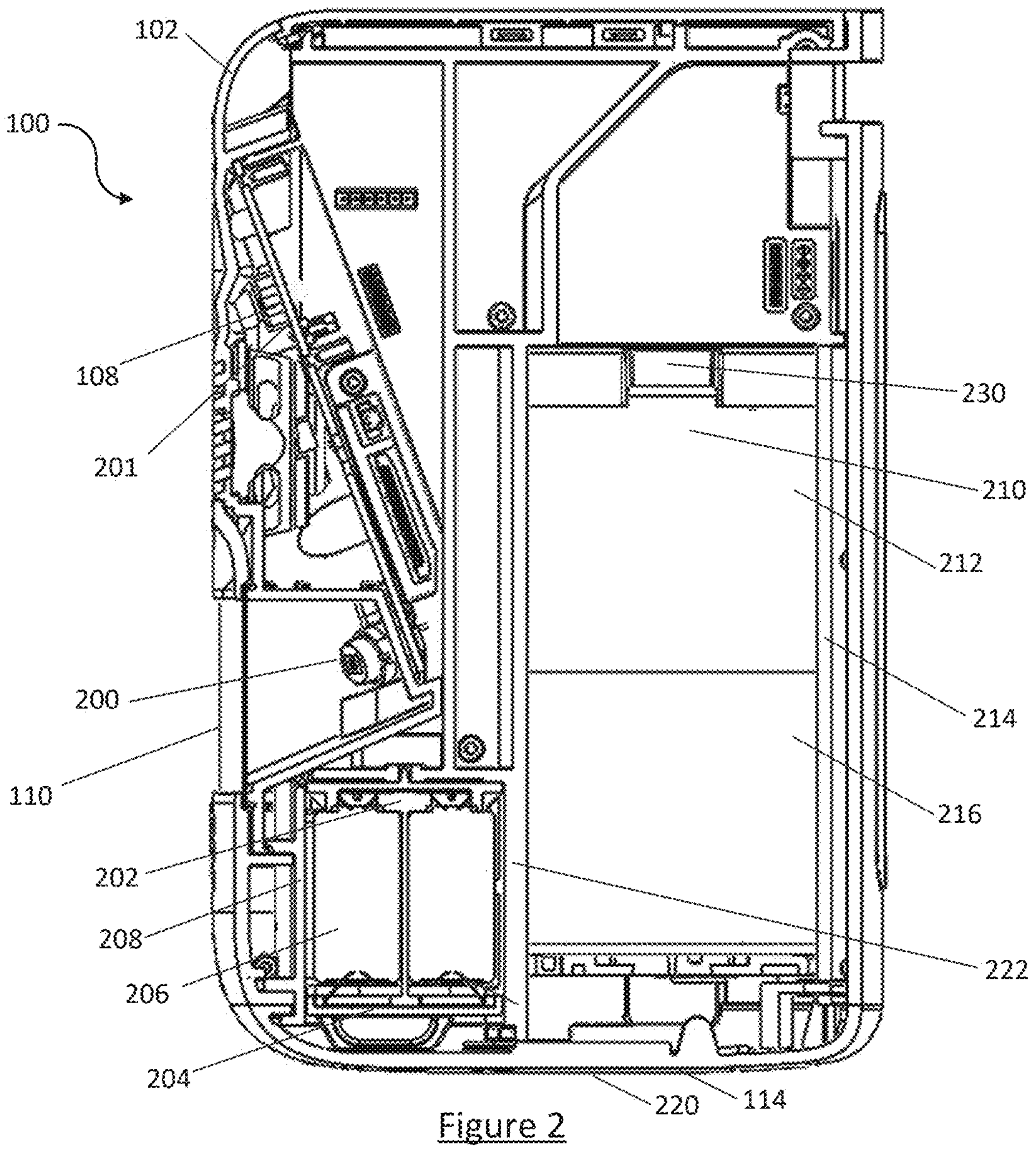
FIG. 2 is a side cross-sectional view of the security device of FIGS. 1A and 1B.

FIG. 2 is a side cross-sectional view of the security device 100 of FIGS. 1A and 1B and shows the location of a camera and other electronic components 201 behind the camera lens 108 and within the body 102. The lens component 110 is shown in front of a pyroelectric sensor 200. As shown in FIG. 2, the pyroelectric sensor 200 is angled downwardly and slightly out of the page, towards the viewer. This is because there are two pyroelectric sensors 200 in the device 100 shown and the other of the pair is located behind the pyroelectric sensor 200 shown and is angled downwardly and slightly out of the rear of the page, away from the viewer. As such, the two pyroelectric sensors 200, together, provide a symmetric field of view about a vertical centre of the device 100. Substantially below the pyroelectric sensor 200, in a front portion of the body 102 there is a battery holder receiving portion 202 for receiving therein an insertable battery holder 204 for holding at least one battery 206. The battery holder receiving portion 202 comprises a battery holder receptacle 208 for containing the battery holder 204 therein. A part of the body 102 comprising the battery holder receiving portion 202 may generally be referred to as a battery holding area.

The receipt of the battery holder 204 into the battery-holder receiving portion 202 (as shown) forms an electrical path between electrical terminals on a top of the battery holder and circuitry in the body 102 of the device, when the battery holder 204 is fully inserted in the battery holder receiving portion 202.

The body 102 also comprises an emission unit receiving portion 210 for holding an emission unit 212 for emitting the matter in response to a delivery of energy derived from the at least one battery 206. The emission unit receiving portion 210 is provided in a rearward portion of the body 102 and comprises an emission unit receptacle 214 for containing the emission unit 212 therein. The emission unit 212 comprises an emission unit housing 216 within which is held a replaceable canister 700 (not shown in FIG. 2) in which the air-suspended light-obscuring matter is generated.

The holding of the emission unit 212 in the emission unit receiving portion 210 comprises the emission unit 212 being in a position in which the emission unit 212 has an electrical connection to control circuitry in the body for receiving the delivery of electrical energy. The emission unit 212 is configured to generate the air-suspended light-obscuring matter (e.g. smoke or fog) upon delivery of the energy. In some embodiments, the control circuitry comprises a switch 230 to identify when the emission unit 212 is being withdrawn from the emission unit receiving portion 210.

The emission unit 212 has an outlet 702 (not shown in FIG. 2) for emitting the matter and the outlet 702 is positioned, when the emission unit 212 is held in the emission unit receiving portion 210, toward a bottom surface 114 of the device 100 to emit the matter from a bottom side 220 of the device 100.

The emission unit receiving portion 210 and the battery holder receiving portion 202 are adjacent to each other whereby neither one is on top above the other. Furthermore, the emission unit receiving portion 210 and the battery holder receiving portion 202 are each open at adjacent locations to a common bottom side 220 of the body for entry and removal of the emission unit 212 and the battery holder 204 in parallel directions (although the common side in other embodiments may be any side of the device). This allows for an unobstructed path for emission of the light-obscuring matter from the emission unit 212 and having the common side at the bottom provides easy access to replace the batteries 206 while the device 100 is mounted on a wall.

Furthermore, by having a removable battery holder 204, the batteries 206 are readily replaced with minimal fiddling. Similarly, the replacement of a canister in the emission unit 212 is easily facilitated while the device 100 is mounted on the wall.

The body 102 comprises a mechanical barrier 222, e.g. a wall, between the battery holder receiving portion 202 and the emission unit receiving portion 210 and between the battery holder receptacle 208 and the emission unit receptacle 214. The mechanical barrier 222 lies in a plane that is parallel to a longitudinal axis of the emission unit 212 when held in the emission unit receiving portion 210. The mechanical barrier 222 may serve to guide the emission unit 212 and/or battery holder 204 on entry into and/or removal from the emission unit receiving portion 210 and battery holder receiving portion 202, respectively. Advantageously, the mechanical barrier 222 is thermally insulative (e.g. by being comprised of a plastic or thermoplastic, for example PC-ABS) so that heat generated by either the batteries 206 or the emission unit 212 is not transferred through the mechanical barrier 222, or at least minimally. This ensures, for example, that heat resulting from the generation and/or emission of the air-suspended light-obscuring matter does not serve to heat the batteries 206, and therefore the risk of battery 206 malfunction or explosion due to heat is ameliorated.

Figure 3A:
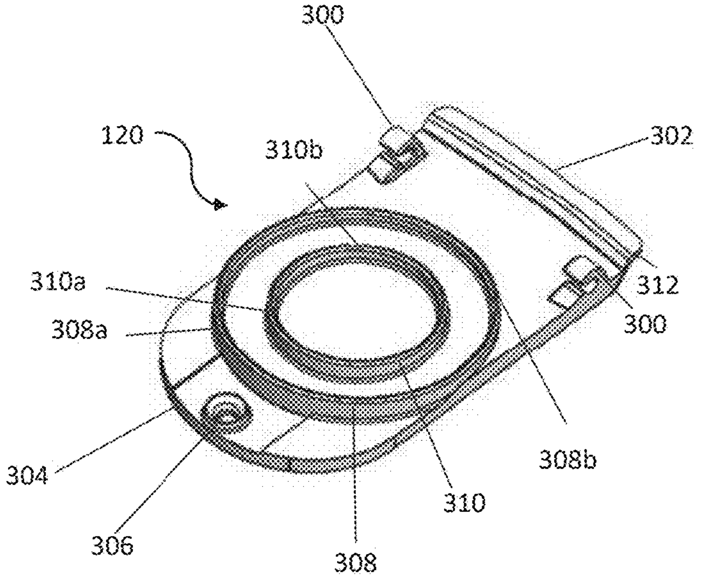
FIG. 3A is a view of an inner surface of a door of the security device of FIGS. 1A, 1B and 2.

FIG. 3A illustrates a view of the door 120 when the door 120 is not yet fitted into the rest of the device 100. An inner surface of the door 120 is visible. The inner surface is a surface of the door 120 that is inside the body 102 of the device 100 when the door 120 is in a closed position.

The door is formed of a high temperature plastic or thermoplastic material, for example PC-ABS (Polycarbonate/Acrylonitrile Butadiene Styrene). The door 120 comprises a pair of hinge components 300 for interfacing with a corresponding pair of hinge pins 400 (not shown in FIG. 3A) that are formed in the bottom portion 118 of the device 100. The hinge components 300 are offset from a first end 302 of the door 120. When assembled, the first end 302 of the door 120 is positioned towards the back of the device and an opposing second end 304 of the door 120 is positioned nearer the front of the device 100 than the first end 302.

An angled feature 312 is formed at the first end 302 of the door 120. The angled feature 312 comprises an end surface at a first edge of the door at the first end 302, which forms an acute angle with a plane of the door. The end surface at the first edge of the door is not perpendicular to the plane of the door. More particularly, the angled feature forms an acute angle with a face of the door that faces into the body 102 when the door is closed, and an obtuse angle with a face of the door that faces externally from the body 102 when the door is closed.

The door further comprises a recess 306 that is positioned towards the second end 304 of the door. When assembled, a piece of ferromagnetic material (not shown) is fixed within the recess 306. The ferromagnetic material may be any suitable type of ferromagnetic material. The ferromagnetic material may be a magnet. In use, the magnetic material within the recess 306 interacts with a corresponding magnet (not shown) to hold the door 120 in the closed position. The magnet is fixed in a recess 402 (not shown in FIG. 3A) in the bottom portion 118. In another embodiment, a magnet is fixed within recess 306 of the door 120, and a piece of ferromagnetic material is fixed within recess 402 of the door 118.

In further embodiments, the door 120 may be held in the closing position by any suitable method such as by friction fit, a biasing member or spring, or the like, until it is opened, e.g. by the release of light-obscuring matter. The magnet may be replaced or supplemented by any suitable closing mechanism.

The door 120 further comprises a first raised feature 308 and a second raised feature 310, each formed on the inner surface of the door.

Figure 3B:
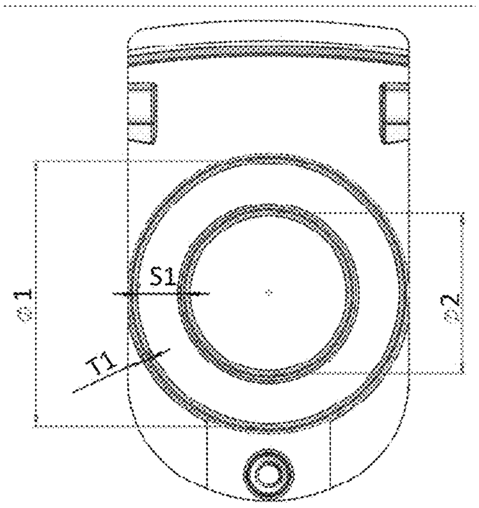
FIG. 3B is a further view of the door of FIG. 3A, with dimensions marked.

FIG. 3B is an inner view of the door 120 on which dimensions of the first raised feature 308 and second raised feature 310 are indicated. The raised features 308, 310 are relatively narrow protrusions from the inner surface and may be referred to as ribs. The first raised feature 308 is a circular raised feature having a diameter Ø1. The second raised feature 310 is a circular raised feature having a diameter Ø1 and is positioned concentrically within the first raised feature 308. A radial separation between the first and second raised features 308, 310 is shown as S1. Each of the first raised feature 308 and second raised feature 310 has a rib thickness of T1.

In one example, the diameter Ø1 of the first raised feature 308 is 30.40 mm; the diameter Ø2 of the second raised feature 310 is 18.40 mm; the radial separation S1 between the first and second raised features is 6.00 mm; and a thickness of each of the first raised feature 308 and second raised feature 310 is 0.80 mm.

Figure 9A:
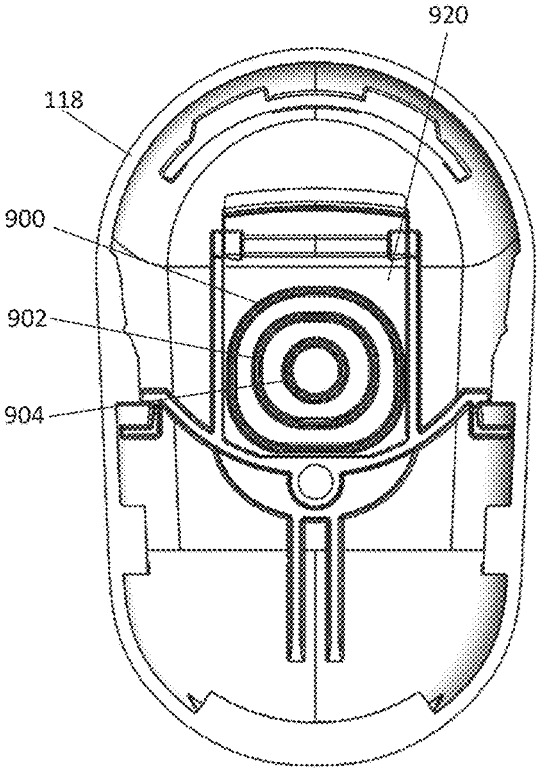
FIG. 9A is a view of an inner surface of a door in accordance with a further embodiment.
Figure 9B:
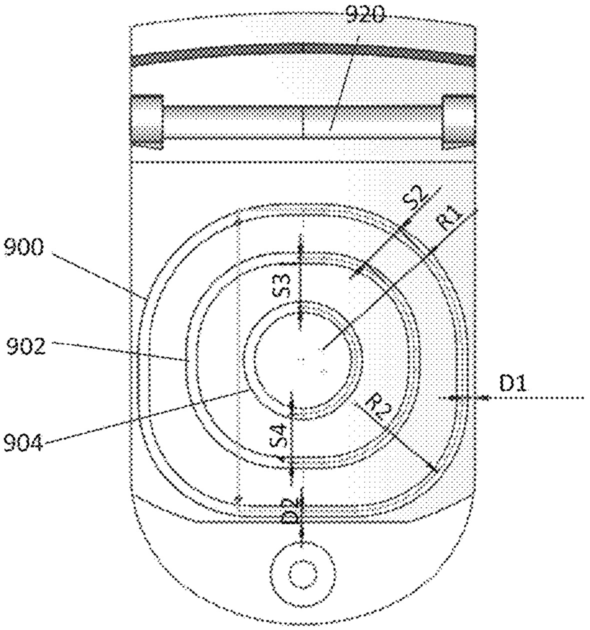
FIG. 9B is a further view of the door of FIG. 9B.

In other embodiments, any suitable number of raised features, for example 1, 2, 3 or 4 raised features may be formed in, or attached to, a region of the inner surface of the door 120 that intersects the trajectory of the emitted matter when the emitted matter is incident on the closed door 120. One example of a further door having 3 raised features is shown in FIGS. 9A and 9B. Alternatively or additionally, any suitable number of recessed features may be formed in the region of the inner surface in the region of the inner surface that intersects the trajectory. The raised or recessed feature or features may be shaped and positioned to resist flow of matter emitted from the emission unit to thereby increase a force upon the door by the flow.

Figure 4:
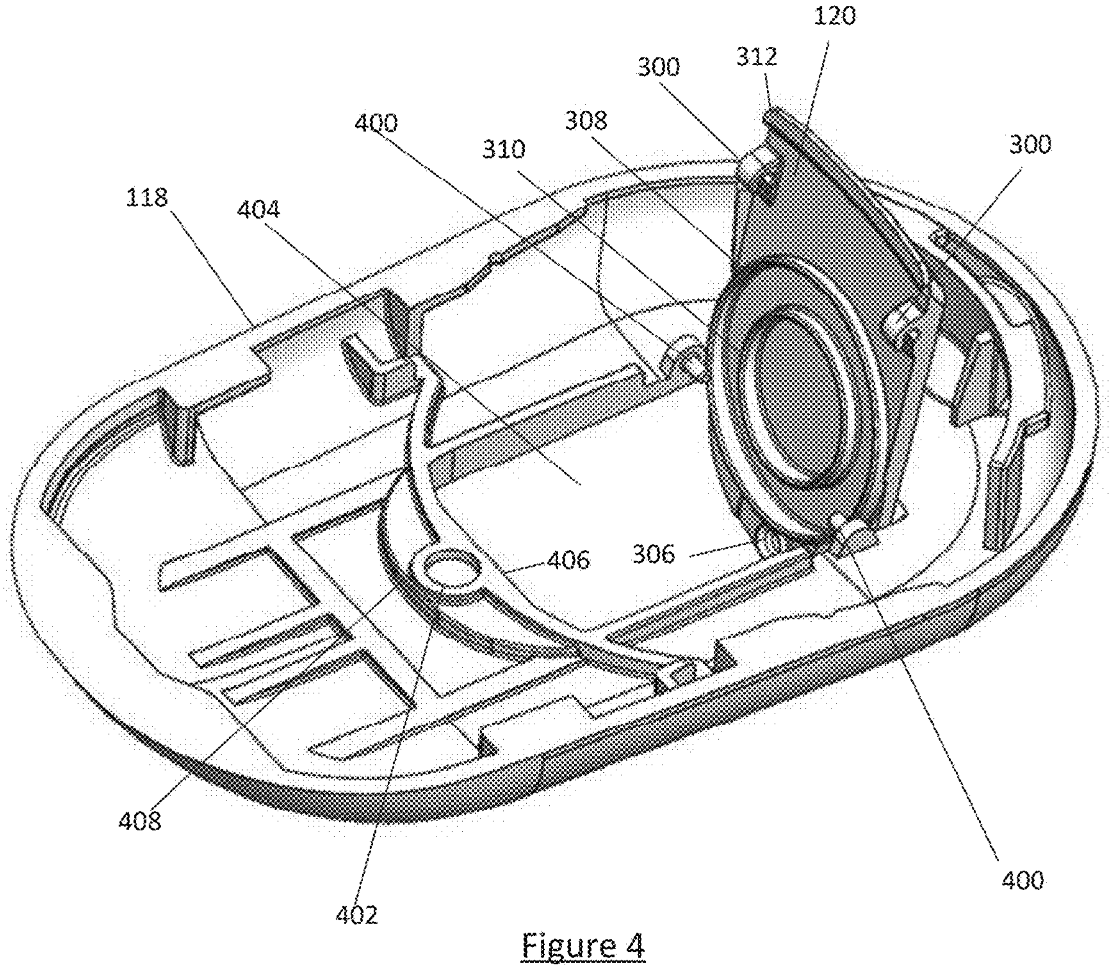
FIG. 4 is a view of a bottom portion of the security device of FIGS. 1A, 1B and 2, with the door of FIG. 3 shown before attachment to the bottom portion.

FIG. 4 illustrates a view of the bottom portion 118 in which an inner surface of the bottom portion is visible. The inner surface is a surface that is inside the body of the device 100 when the bottom portion 118 is coupled to the rest of the device 100. The door 120 is shown in a position where it is not yet attached to the bottom portion 118 but is in a position ready to be attached to the bottom portion 118.

An opening 404 in the bottom portion 118 is to be covered by the door 120 when the door 120 is attached and in a closed position. The opening 404 is an external opening in the body 102, allowing passage therethrough of material emitted from the emission unit 212, so as to provide the matter to a region external to the body 102 of the device 100.

Two hinge pins 400 are configured to couple with the hinge components 300 of the door 120.

A recess 402 on the inner surface of bottom portion 118 is positioned adjacent to a front end 406 of the opening 404. When assembled, the recess 402 holds a magnet (not shown). In use, the magnet in recess 402 interacts with the ferromagnetic material in recess 306 to hold the door 120 in the closed position.

By the front end 406 of the opening 404, the bottom portion 118 comprises a stepped feature 408 that corresponds in shape to the second end 304 of the door 120. When the door is closed, a portion of the door 120 at the second end 304 of the door 120 is accommodated within the stepped feature 408. The stepped feature 408 places the magnet in recess 402 such that it is recessed back from the bottom surface 114 of the bottom portion 118. The stepped feature

408 allows an outer face of the door 120 to become flush with the bottom surface 114 of the bottom portion 118 when the door 120 is in the closed position.

Figure 5:
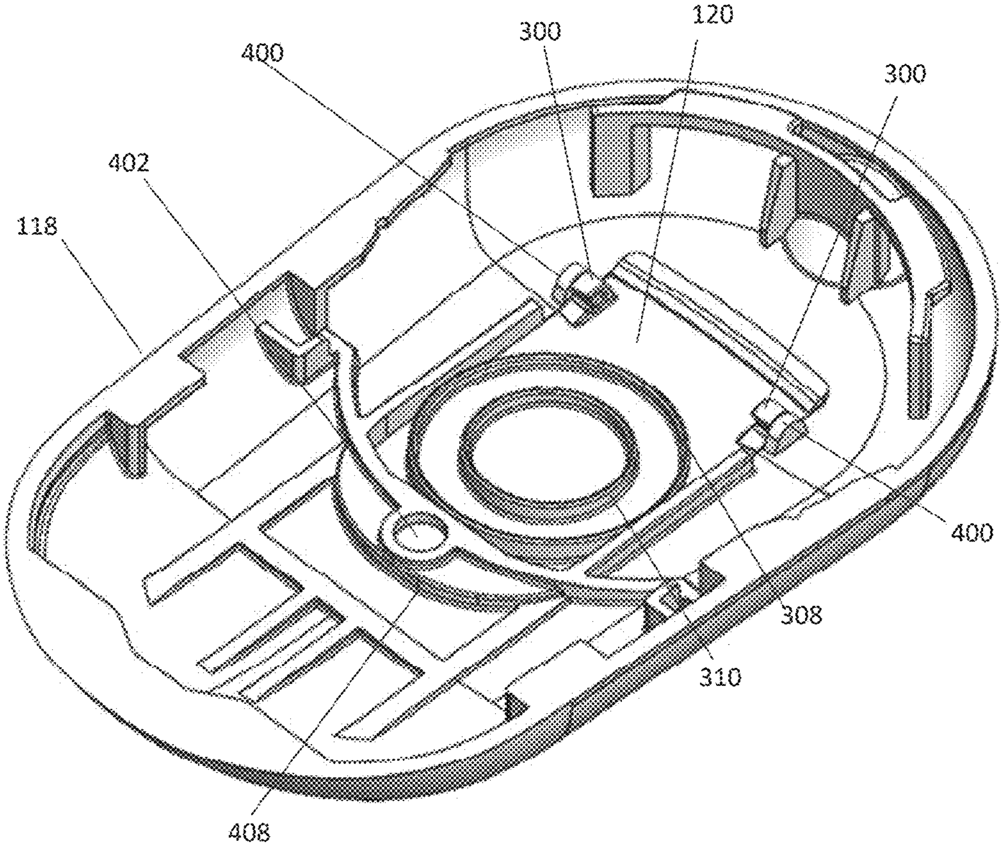
FIG. 5 is a view of the bottom portion of the security device of FIGS. 1A, 1B and 2, with the door of FIG. 3 shown when attached to the bottom portion and in a closed position.
Figure 6:
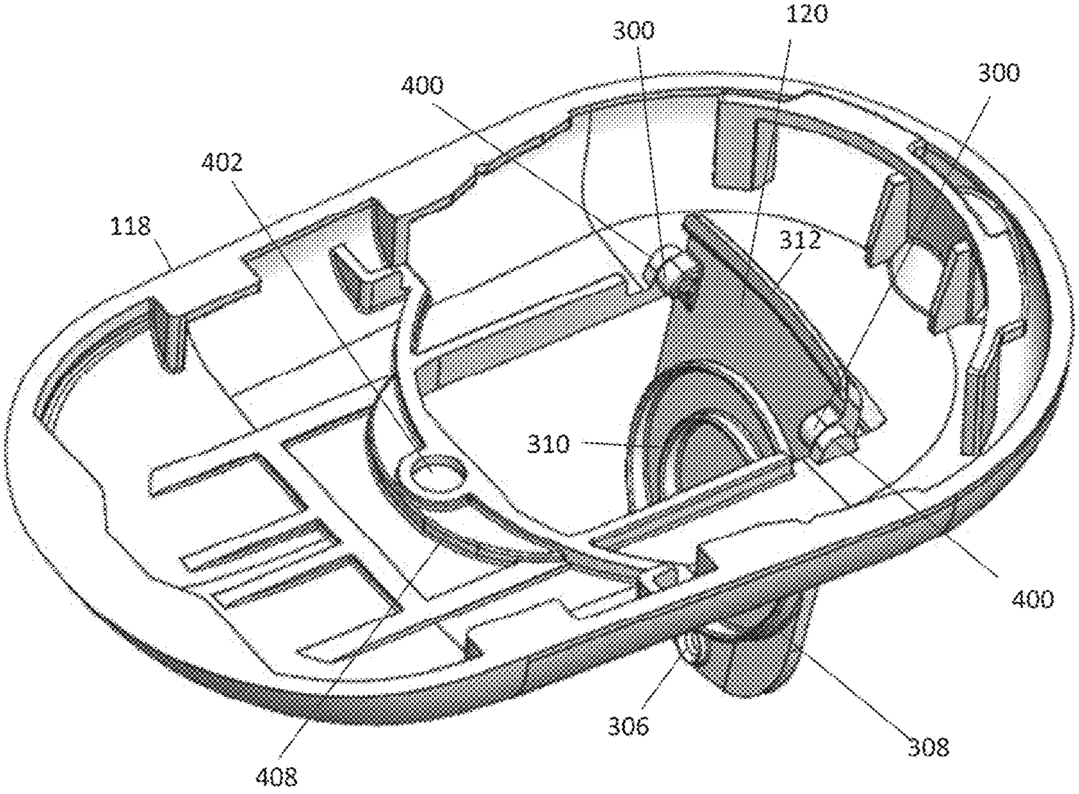
FIG. 6 is a view of the bottom portion of the security device of FIGS. 1A, 1B and 2, with the door of FIG. 3 shown when attached to the bottom portion and in a closed position.

FIGS. 5 and 6 also illustrate views of the bottom portion 118 in which the inner surface of the bottom portion is visible. The door 120 is attached to the bottom portion 118 by coupling the hinge components 300 of the door 120 to the hinge pins 400 of the bottom portion 118. In FIG. 5, the door 120 is shown in the closed position. In FIG. 6, the door 120 is shown in an open position. The door 120 moves between the closed position and the open position by pivoting around a pivot axis defined by the hinge pins 400.

Figure 7:
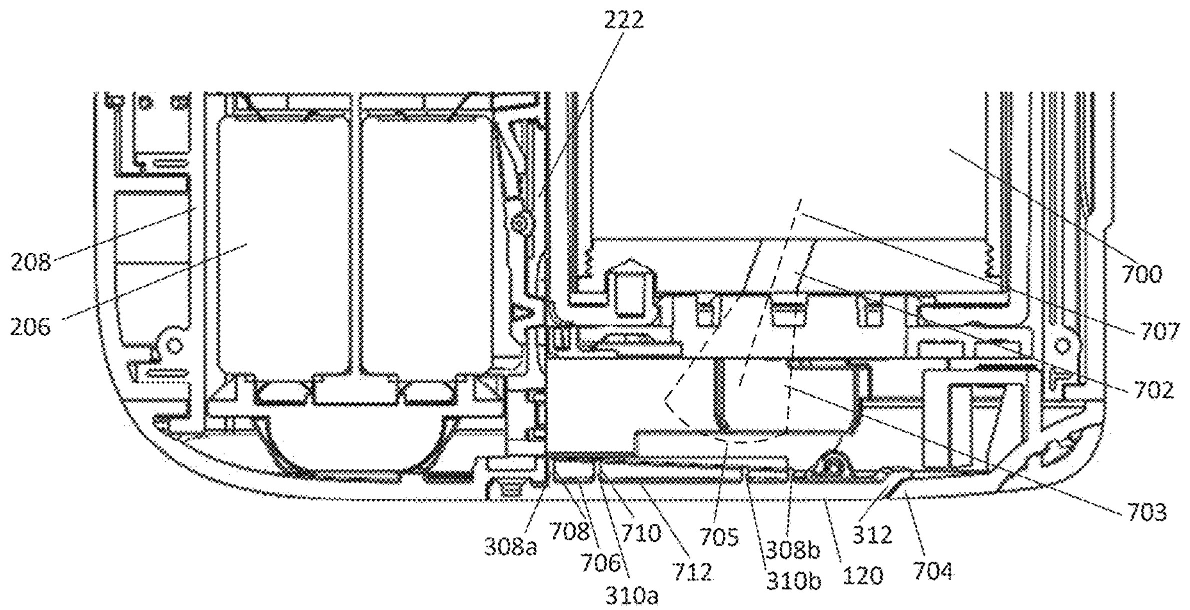
FIG. 7 is an enlarged side cross-sectional view of the bottom portion of the security device of FIGS. 1A, 1B and 2, with the door of FIG. 3 shown when attached to the bottom portion and in a closed position.
Figure 8:
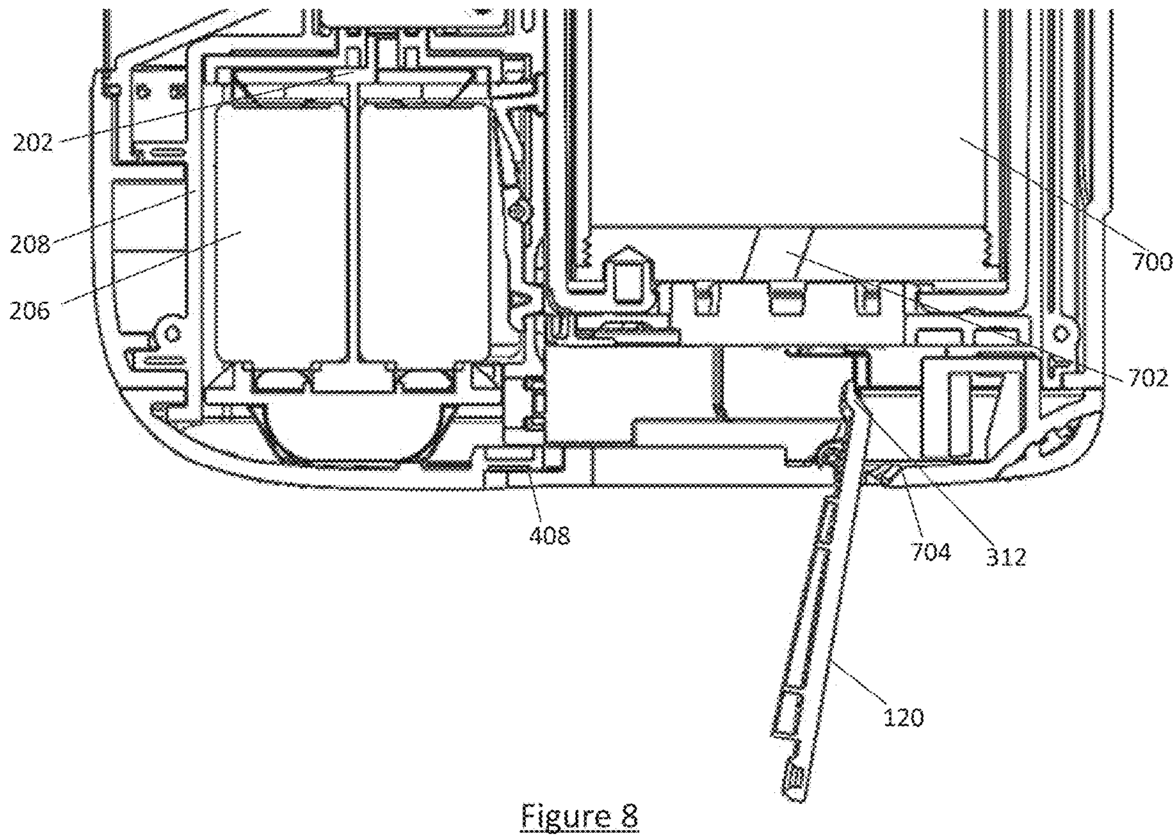
FIG. 8 is an enlarged side cross-sectional view of the bottom portion of the security device of FIGS. 1A, 1B and 2, with the door of FIG. 3 shown when attached to the bottom portion and in a closed position.

FIGS. 7 and 8 each illustrate a side cross-sectional view of the bottom portion 118. In FIG. 7, the door 120 is shown in a closed position. In FIG. 8, the door 120 is shown in an open position.

It may be seen that the door 120 occupies only a portion of the bottom surface 114 of the bottom portion 118. In particular, the door 120 does not overlap the battery holding area. The battery holding area remains closed even when the door is open. By keeping the battery holding area closed when the door is open, matter may be prevented from entering the battery holding area. Further, by keeping the battery holding area closed when the door is open, the batteries may be insulated from heat caused by the emission of the matter.

FIG. 7 provides further detail of how the door 120 fits into the opening 404 of the bottom portion 118 when the door is closed. A rear edge of the opening 404 comprises an angled feature 704 that is configured to interface with the angled feature 312 at the first end 302 of the door 120. The use of corresponding angled features 312, 704 on the door 120 and the edge of the opening 404 avoids a gap being present when closed that could enable a person to see into the device. Advantageously, the use of corresponding angled features 312, 704 provides a flush fit between the door 120 and the bottom portion 118 when the door 120 is closed. The flush fit may keep the interior of the body 102 at least partially isolated from the outside environment. The flush fit may minimise dust, water or foreign material that could otherwise enter the device 100 to potentially interfere with electronics or other components of the device 100.

By the front end 406 of the opening 404, the stepped feature 408 corresponds in shape to the second end 304 of the door 120. When the door is closed as shown in FIG. 7, a portion at the second end 304 of the door 120 is accommodated within the stepped feature 408. Advantageously, the use of stepped feature 408 provides a flush fit between the door 120 and the bottom portion 118 when the door 120 is closed.

FIGS. 7 and 8 each show a canister 700 having an outlet 702. The canister 700 is held within an emission unit housing 216 of the emission unit 212. The outlet 702 is configured to emit matter downwards and forwardly, but more downwards than forwardly. In one example, an angle of the outlet 702 with respect to a vertically downwards axis is 20 degrees. Matter from the outlet 702 has a circular or ovoidal cross section with gradually increases as the front 705 of the flow extends from the outlet 702. The matter emitted may thereby be described as having a cone-shaped trajectory, which may also be referred to as a cone trajectory 703. The cone shaped trajectory has a central axis 707 that is 20 degrees forward of a vertically downwards axis, which is parallel to a longitudinal axis of the emission unit 212. In the same example, when the door 120 is in the closed position, a vertical distance between a bottom end of the outlet 702 and the door 120 is 29.6 mm.

In operation, the device 100 is configured to detect the motion or presence of a living entity within a detection area and, if the presence or motion of the living entity is detected, to emit the gathering of air-suspended light-obscuring matter, either automatically or upon receiving an emit instruction from a remote device that had been notified of the detected motion. However, additional or alternative different triggers could be used to trigger the release of the light-obscuring matter.

The canister 700 in the emission unit 212 contains chemicals that react responsive to the supply of the energy to generate the light-obscuring matter, which is then emitted from the outlet. The reaction to generate the light-obscuring matter is generally exothermic. Although a specific example of an emission unit 212 is described above, other types of emission units for emitting light-obscuring matter could be used, e.g. a pressurized canister filled with the light-obscuring matter could be used instead. Furthermore, although in examples the light-obscuring matter is generated in-situ when needed for use by the emission unit 212, it will be appreciated that stored light-obscuring matter could be released instead.

The door is configured to be operable into the open position when the light-obscuring matter passes or is to pass through the opening 404.

The door 120 is in a default closed position before emission of matter is triggered. In response to a trigger signal, power is provided to electrical terminals of the emission unit 212. A reaction is triggered within the emission unit 212, resulting in production and release of the matter. The matter is emitted through the outlet 702.

Matter emitted from the outlet 702 impacts the inner surface of the closed door 120. A force or pressure of the matter impacting the door 120 causes the door 120 to rotate from the closed position as shown in FIG. 5 and FIG. 7 to the open position as shown in FIG. 6 and FIG. 8.

The door is equipped with a flow containment feature. The flow containment feature may act as a flow concentrator to increase a torque upon the door by the flow of the matter. The flow containment feature is shaped to provide some containment of the flow to increase a pressure of emitted matter against a part of the door, the pressure being in direction that is tangential to a rotational arc about a pivot axis of the door.

The flow containment feature is in some embodiments provided by one or more raised features 308, 310, which may be raised relative to one or more adjacent recesses in the door 120. The raised features 308, 310 may be formed by having one or more walls extending perpendicularly from a plane of the door 120, whereby at least a part of each wall faces a front of the flow of the matter when the door is closed. The plane of the door is parallel to the bottom surface 114 of the bottom portion 118.

In the illustrated example, a first raised feature 308 and a second raised feature 310 are sized and position so that the second raised features 310 lies within the first raised feature 308 with a recess therebetween. The central axis 707 of the cone trajectory 703 may lie within an area having a perimeter defined by the second raised feature 310. The cross-section of the trajectory of the flow may more broadly lie within an area having a perimeter defined by the first raised feature 308. In other embodiments, across-section of the trajectory of the matter more generally lies within an area of the door 120, or more particularly, within the perimeter of a largest one of one or more raised or recessed features that are present on the inner surface of the door 120 to facilitate opening of the door 120 when light obscuring matter is emitted from the emission unit 212.

The raised features 308, 310 are shaped and positioned to resist flow of matter emitted from the emission unit 212. Referring to FIG. 3A, the first raised feature 308 provides a first, distal wall portion 308*a* and a second, proximal wall portion 308*b*, the terms distal and proximal here being with respect to the pivot axis of the door. Likewise the second raised feature 310 provides a first, distal portion 310*a* and a second, proximal wall proximal portion 310*b*. The term The proximal portions of the raised feature 308 and raised feature 310 each provide a respective surface 708, 710 that faces the flow of the matter when the door is closed. The surface 708 forms a junction with a relatively recessed portion 706 of the door 120. Similarly, the surface 710 forms a junction with a relatively recessed portion 712 of the door 120.

These surfaces 708, 710 of the distal wall portions 308*a*, 310*a* act to deflect flow towards a path that is tangential to the rotational arc about the pivot axis of the door to thereby increase a pressure and thereby torque upon the door by the flow of matter. The increasing of pressure is also aided by the proximal wall portion 310*b*, which acts to inhibit the spread of the matter in the proximal direction, from its adjacent recess 712. Likewise, the other proximal wall portion 308*b* also acts to inhibit the spread of the matter in the proximal direction, from its adjacent recess, between the proximal wall portions 308*b* and 310*b*.

By using raised features 308, 310 to increase the torque upon the door, more effective or reliable door opening may be obtained.

After the door 120 is opened, matter continues to be emitted, for example until the canister 700 is empty of matter. The matter is emitted downwards and forwardly, but more downwards than forwardly, for example 20 degrees forward of downwards.

In another embodiment, a further mechanism is used to initiate or assist in the opening of the door in addition to the force or pressure exerted by the matter on the inside of the door. For example, the magnet used to hold the door closed may be an electromagnet that is turned off when a trigger is received. A mechanical assembly may be driven to push open the door.

FIG. 9A is a view of a further door 920 having a different arrangement of raised features 900, 902, 904. Each of the raised features 900, 902, 904 is a continuous rib that defines a perimeter of a respective region of the door. The second raised feature 902 is entirely inside the region defined by the first raised feature 900. The third raised feature 904 is entirely inside the region defined by the second raised feature 902. In the door of FIG. 9A, the inner raised feature 904 is circular but the middle and outer raised features 900 and 902 are shaped as a respective rings that are deformed to define a generally rectangular perimeter with rounded corners.

FIG. 9B is a further view of the further door 920, which is marked up with dimensions of the raised features 900, 902, 904. Raised feature 900 and raised feature 902 are separated by a separation distance S2. Raised feature 902 and raised feature 904 are separated by separation distances S3, S4. Raised feature 900 has a first radius R1 at a first point on its circumference and a second, different radius of R2 at a second, different point on its circumference. A distance between raised feature 900 and an edge of the door 920 is distance D1 at a first position on the door 920 and distance D2 at a second position on the door 920.

In an example, each of the separation distances S2, S3, S4 is 4.50 mm; radius R1 is 13 mm; radius R2 is 10 mm; and each of distances D1, D2 is 1.20 mm.

Figure 10:
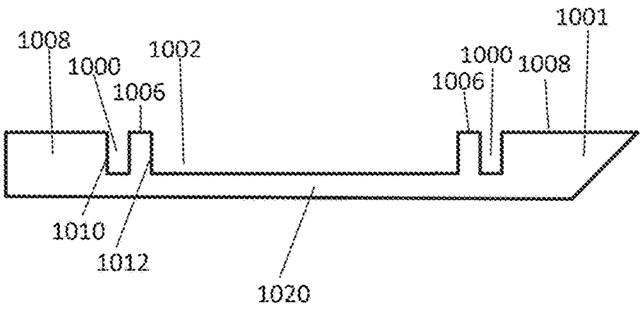
FIG. 10 is a cross section of a door in accordance with a further embodiment, in which recessed features are formed on an inner surface of the door.

FIG. 10 shows an example of a cross-section of a door 1020 having pivoting end 1001, and n which are formed a first, ring-shaped recess 1000 and a second 1002 shaped as closed circle. FIG. 10 is not drawn to scale.

The first recess 1000 is recessed relative to a peripheral part 1008 of the door. In other words, the peripheral part 1008 may be considered a first, raised feature, being raised relative to the recess 1000. Thus, the peripheral part 1008 acts like the first raised feature 308 of the door 102, which is likewise raised relative to a medial recess. Between the first recess 1000 and the second recess 1002 is a ring-shaped second raised part 1006, which acts like the second raised feature 310 of the door 102.

An outer surface 1010 of recessed feature 1000 forms a wall facing a front of the flow of the matter. An outer surface 1012 of recessed feature 1002 forms a further wall facing a front of the flow of the matter.

Figure 11:
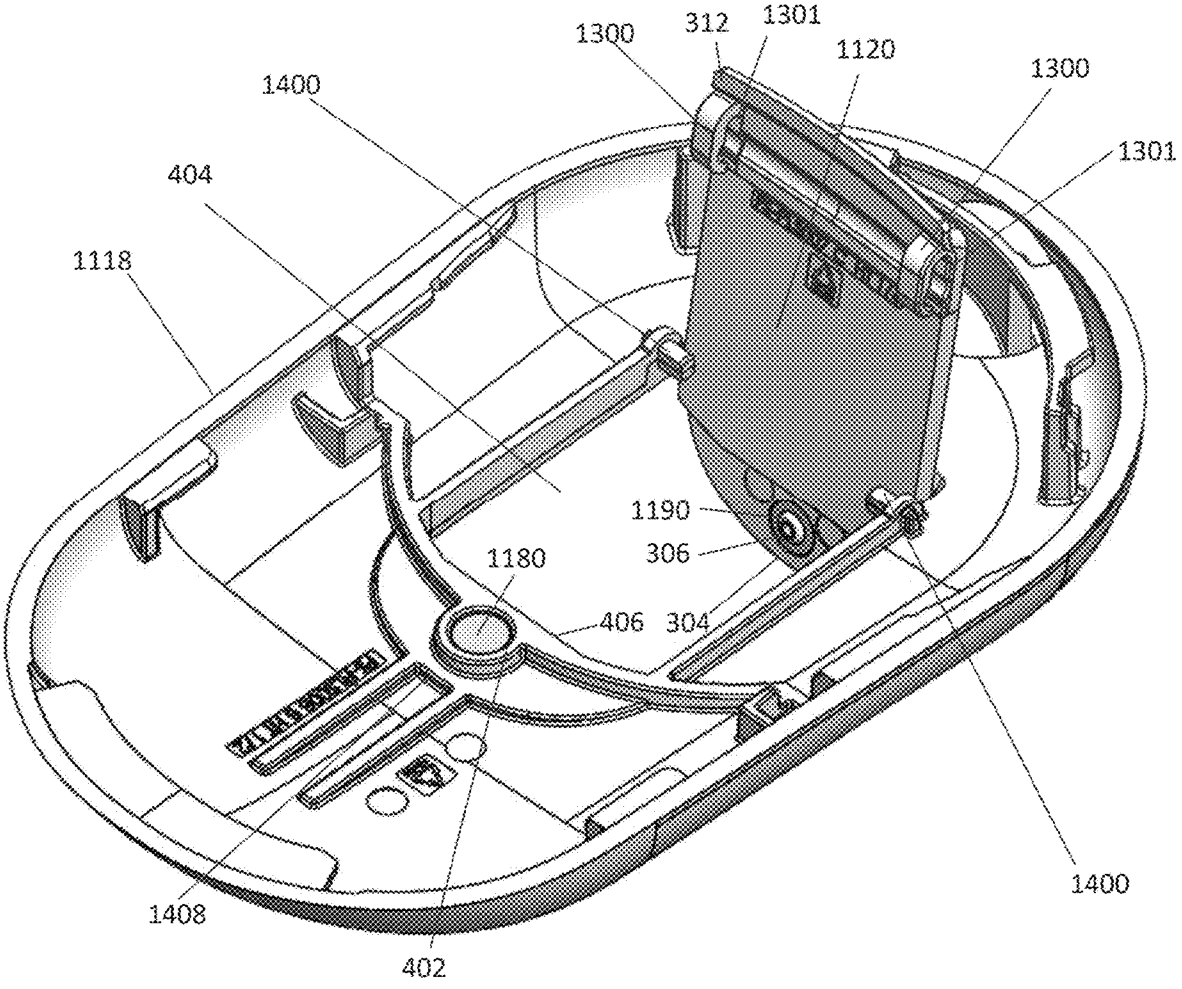
FIG. 11 is a view of a bottom portion and door of a security device in accordance with a further embodiment, shown before attachment of the door to the bottom portion.
Figure 12:
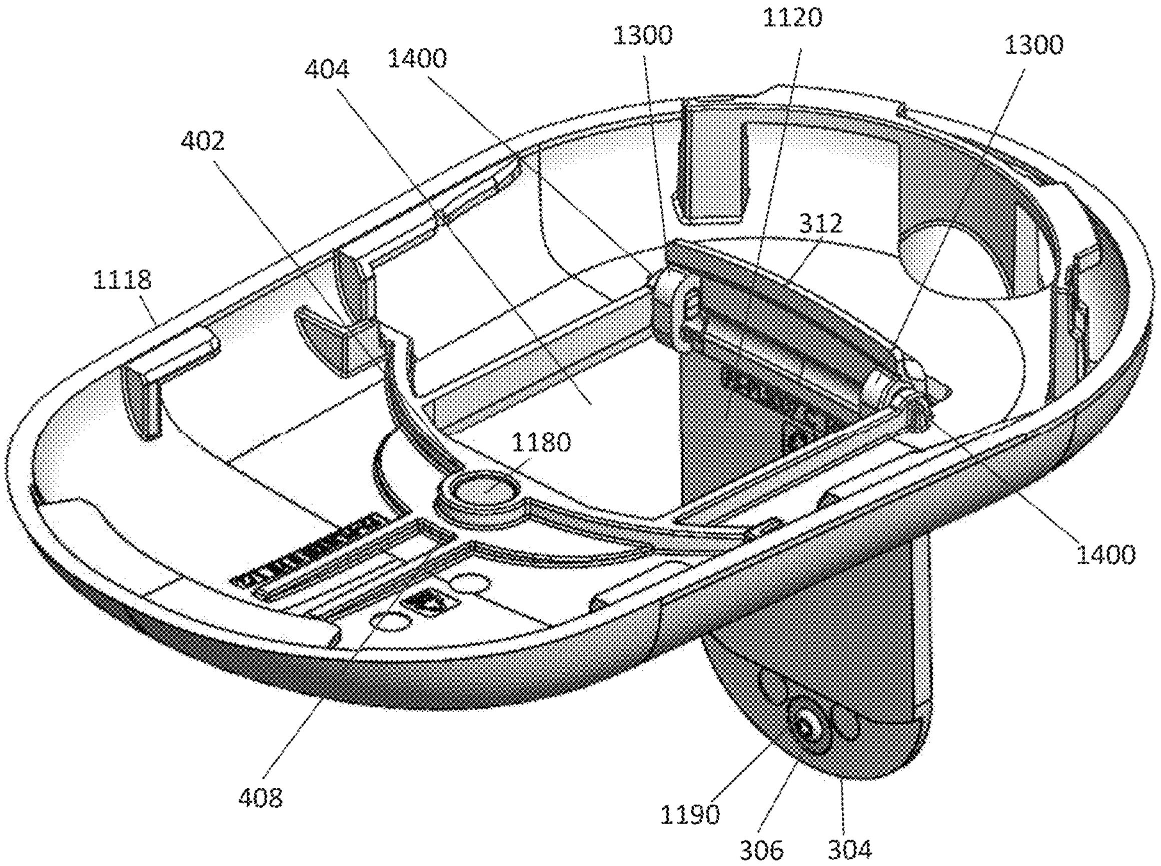
FIG. 12 is a view of the bottom portion and door of FIG. 11, shown with the door attached to the bottom portion, and hanging in an open position.

As described above, raised or recessed features on the inner surface of a door of a visibility-impairing security device may be used, for example to increase a torque upon the door. However, in some embodiments there is no need to increase torque upon the floor, and in any case, optionally, no such raised or recessed features are provided. For example, the inner surface of the door may be flat and/or smooth. FIGS. 11 and 12 illustrate an embodiment in which an inner surface of the door is flat and smooth.

FIG. 11 illustrates a view of an exemplary bottom portion 1118 of the body of a visibility-impairing security device in accordance with an embodiment. An inner surface of the bottom portion 1118 is visible in FIG. 11. The remainder of the body of the device, which may also be referred to as main portion of the body of the device, is not shown in FIG. 11 but may be the same as that shown in, for example, FIG. 1A and FIG. 2.

The bottom portion 1118 may be the same as the bottom portion 118, but for having a different door 1120. Unlike in the embodiments of FIG. 3 to 10, the inner surface of the door 1120 does not comprise raised features or recessed features to deflect the flow. Instead, the inner surface of door 1120 is flat and smooth.

The door 1120 is shown in a position in which it is not yet attached to the bottom portion 1118. An opening 404 in the bottom portion 1118 is to be covered by the door 1120 when the door 1120 is attached and in a closed position.

Two hinge pins 1400 are included on the bottom portion 1118 and are configured to couple with two hinge components 1300 of the door 1120. Each of the hinge components 1300 comprises a respective opening having arcuate wall sections for rotating about the corresponding pin 1400. From the arcuate wall sections the opening extends to form a slot 1301, which is provided to straddle around and hug flat sides of the corresponding pin 1400 to thereby hold the door in a vertical orientation when the door 1120 is in an open position.

A recess 402 on the inner surface of bottom portion 1118 is positioned adjacent to a front end 406 of the opening 303. The recess 402 holds a magnet 1180.

A recess 306 in door 1120 holds a ferromagnetic material 1190, which may also be referred to as a ferromagnet. In the embodiment of FIG. 11, the ferromagnet 1190 is a metal washer which is held in place in recess 306 by heat staking. In other embodiments, any suitable ferromagnet 1190 may be used. The ferromagnet 1190 may be held in place using any suitable technique.

In use, the magnet 1180 in recess 402 interacts with the ferromagnet 1190 in recess 308 to hold the door 1120 in the closed position. It will be appreciated that in other embodiments, the positions of the ferromagnet 1190 and the magnet 1180 may be reversed to thereby be in the bottom portion 1180 and the door 1120 respectively.

The bottom portion 1118 further comprises a stepped feature 1408 at the front end 406 of the opening 404, wherein a curve of the stepped feature 1408 corresponds in shape to the second end 304 of the door 1120. When the door 1120 is closed, a portion of the door 1120 at the second end 304 of the door 1120 is accommodated within the stepped feature 1408, in a similar manner to that described above with reference to FIG. 4.

FIG. 12 illustrates a further view of the bottom portion 1118 of FIG. 11, in which the door 1120 is attached to the bottom portion 1118 by coupling the hinge components 1300 of the door 1120 to the hinge pins 1400 of the bottom portion 1118. In FIG. 12 the door 1120 is hanging in the open position and held vertically.

In other embodiments one or more raised features for increased resistance to the flow of the matter may lie along a straight line. In one example, a door may have a first straight wall and a second straight wall, respectively extending along a first axis and a second wall that are parallel to each other and to a rotational axis of the door. In this example, the door may have a cross section appearing the same as in FIG. 7, but having only the left parts of raised features 310 and 308 from the perspective of that cross-section. The right parts of the cross section of FIG. 7 could, if included, optionally be provided by raised features.

It will be understood that in the various embodiments described, there is some kind of security related event (e.g. a detected motion, or an instruction from a device that operates within a security system) which triggers directly or indirectly the output of the light obscuring matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Furthermore, features described in relation to one embodiment may be mixed and matched with features from one or more other embodiments, within the scope of the claims.

What is claimed is:

1. A visibility-impairing security device for producing a gathering of air-suspended light-obscuring matter to obscure vision, the device comprising:

a body comprising:

an emission unit receiving portion for holding an emission unit having an outlet for emitting the matter;

an opening for the passing therethrough of the matter from the outlet; and a door for closing the opening, wherein the door is configured to move between a closed position in which the opening is covered and an open position in which the opening is at least partially open, thus allowing for the passing therethrough of the matter from the outlet when the door is in the open position, wherein the emission unit receiving portion is configured to hold the emission unit such that matter emitted from the outlet is emitted towards the bottom of the device, wherein the opening is positioned within a bottom portion of the body of the device, and wherein the bottom portion of the body of the device is releasably attached to a main portion of the body of the device.

2. The device of claim 1, wherein the door is configured to move between the closed position and the open position by rotation around a pivot axis.

3. The device of claim 2, wherein a first end of the door is towards the back of the device, and wherein an axis around which the door rotates is closer to the first end of the door than to a second, opposing end of the door that is nearer the front of the device.

4. The device of claim 3, wherein the axis around which the door rotates is offset from the first end of the door.

5. The device of claim 3, wherein at least one of the first end and the second end of the door comprises a first angled feature configured to interface with a corresponding angled feature at a corresponding end of the opening, and wherein the first angled feature and corresponding angled feature are configured such that a flush fit of the door within the opening is obtained when the door is in the closed position.

6. The device of claim 1, wherein the outlet and the opening are configured so that emission of the matter from the outlet is directed directly through the opening.

7. The device of claim 1, wherein the outlet of the emission unit is oriented to direct the matter downwards and forwardly, but more downwards than forwardly, when the matter is emitted.

8. The device of claim 1, wherein the opening is sized to accommodate a trajectory of the matter emitted from the emission unit, wherein the trajectory of the matter emitted from the emission unit is a cone trajectory, wherein the cone trajectory has a cross section in a plane in which the door lies when the door is closed, and wherein the cross section lies largely, or more preferably, entirely within an area covered by the door.

9. The device of claim 1, wherein the body further comprises one of:

a) a magnet affixed to or near an edge of the door and a corresponding ferromagnetic material affixed to or near a corresponding edge of the opening; or b) a ferromagnetic material affixed to or near an edge of the door and a corresponding magnet affixed to or near a corresponding edge of the opening;

wherein the magnet and ferromagnetic material are configured to hold, or assist in holding, the door in the closed position.

10. The device of claim 1, the bottom portion having a bottom surface, wherein the opening is toward a rear of the bottom surface.

11. The device of claim 10, wherein the bottom surface has a total surface area that is greater than an area spanned by the opening.

12. The device of claim 1, wherein the bottom portion of the body of the device is releasable by a sliding action.

13. The device of claim 12, wherein the bottom portion of the body comprises a push feature at an edge of the bottom portion, wherein the push feature is for assisting in releasing of the bottom portion by finger contact with the push feature; and wherein the opening is offset from said edge of the bottom portion to accommodate positioning of the push feature.

14. The device of claim 1, wherein the body further comprises a battery holding area for holding at least one battery, and wherein the emission unit receiving portion and the battery holding area are adjacent to each other.

15. The device of claim 14, wherein the emission unit receiving portion is longitudinal and the battery holding area is thermally isolated from the emission unit receiving portion.

16. The device of claim 14, wherein the battery holding area is in front of the emission unit receiving portion.

17. The device of claim 14, wherein the opening is positioned such that the opening does not overlap the battery holding area.

18. The device of claim 1, further comprising a lens component located at a front side of the device intended to face away from a wall when a rear of the device is mounted facing a wall, wherein the lens component provides a sensor with a field of view that comprises a field of view that is symmetric about an axis intended to be vertical when the device is mounted against a wall.

19. The device of claim 18, wherein the field of view spans more towards a bottom end of the body than a top end of the body so as be directed more towards a floor than a ceiling when installed in a room.

20. A kit for producing a gathering of air-suspended light-obscuring matter to obscure vision, the kit comprising:

a visibility-impairing security device according to claim 1; and an emission unit for emitting the matter.

* * * * *